United States Patent
Baechler et al.

(10) Patent No.: US 9,164,164 B2
(45) Date of Patent: Oct. 20, 2015

(54) INDOOR LOCALIZATION METHOD AND SYSTEM

(71) Applicant: Ecole Polytechnique Federale de Lausanne (EPFL), Lausanne (CH)

(72) Inventors: Gilles Baechler, Onnens (CH); Reza Parhizkar, Ecublens (CH); Martin Vetterli, Grandvaux (CH)

(73) Assignee: Ecole Polytechnique Federale de Lausanne (EPFL) (CH)

( * ) Notice: Subject to any disclaimer, the term of this patent is extended or adjusted under 35 U.S.C. 154(b) by 0 days.

(21) Appl. No.: 14/215,413

(22) Filed: Mar. 17, 2014

(65) Prior Publication Data

US 2014/0274128 A1 Sep. 18, 2014

(30) Foreign Application Priority Data

Mar. 15, 2013 (CH) ........................................ 0611/13

(51) Int. Cl.
*H04W 24/00* (2009.01)
*G01S 5/14* (2006.01)
*H04W 64/00* (2009.01)
*G01S 5/02* (2010.01)
*H04W 4/04* (2009.01)

(52) U.S. Cl.
CPC ............... *G01S 5/14* (2013.01); *G01S 5/0278* (2013.01); *G01S 5/0289* (2013.01); *H04W 64/00* (2013.01); *H04W 4/043* (2013.01)

(58) Field of Classification Search
CPC ... H04W 64/00; H04W 4/02; H04L 29/08657
USPC .................. 455/456.1, 456.5, 456.6
See application file for complete search history.

(56) References Cited

U.S. PATENT DOCUMENTS

| | | | |
|---|---|---|---|
| 2008/0188236 A1* | 8/2008 | Alles et al. | 455/456.1 |
| 2011/0250904 A1* | 10/2011 | Valletta et al. | 455/456.1 |
| 2012/0165012 A1* | 6/2012 | Fischer et al. | 455/435.1 |
| 2013/0172020 A1* | 7/2013 | Aweya et al. | 455/457 |
| 2014/0073349 A1* | 3/2014 | Schunk | 455/456.1 |
| 2014/0087755 A1* | 3/2014 | Schunk | 455/456.1 |
| 2014/0120931 A1* | 5/2014 | Shin et al. | 455/452.1 |

OTHER PUBLICATIONS

Youssef, M. et al., The Horus WLAN Location Determination System, Proceedings of the 3rd International Conference on Mobile Systems, Applications and Services, 2005, pp. 205-218.
Sadler, B.M. et al, Multi-Modal Sensor Localization Using a Mobile Access Point, 2005, pp. 753-756.
Bahl, P. et al., Radar: An In-Building RF-Based User Location and Tracking System, INFOCOM, 2000, pp. 775-784.
Gwon, Y. et al., Robust Indoor Location Estimation of Stationary and Mobile Users, INFOCOM, 2004, pp. 1032-1041.
Liu, H. et al., Survey of Wireless Indoor Positioning Techniques and Systems, IEEE Transactions on Systems, Man, and Cybernetics, vol. 37, No. 6, Nov. 2007, pp. 1067-1080.

* cited by examiner

*Primary Examiner* — Danh Le
(74) *Attorney, Agent, or Firm* — Blank Rome LLP

(57) ABSTRACT

An indoor localization method for estimating the location of nodes (n1, n2), at least one node (n1) being connected to at least another node (n2) by at least two different channels (ch1, ch1'), comprising the following steps:
  measuring a distance between the connected nodes,
  for each channel, building a Euclidean Distance Matrix (EDM) based on the measured distances,
  estimating the location of the nodes (n1, n2) based on the built Euclidean Distance Matrices.

28 Claims, 4 Drawing Sheets

INDOOR LOCALIZATION METHOD AND SYSTEM

REFERENCE DATA

The present invention claims the priority of Swiss Patent Application CH0611/13 filed on Mar. 15, 2013, the contents of which is hereby enclosed by reference.

FIELD OF THE INVENTION

The present invention concerns an indoor localization method and system. In particular, the present invention concerns an indoor localization method and system in a multi-channel setting.

DESCRIPTION OF RELATED ART

While outdoor localization can be considered as a solved problem using GPS and its derivatives, indoor localization is still under investigation.

Current indoor localization schemes mostly use a single channel type to infer the distance information.

A complete survey of methods addressing the indoor localization problem can be found in H. Liu, H. Darabi, P. Banerjee, and J. Liu, "*Survey of wireless indoor positioning techniques and systems,*" IEEE Transactions on Systems, Man, and Cybernetics, vol. 37, no. 6, pp. 1067-1080, November 2007.

Localization techniques can be classified into two main categories: scene analysis and triangulation methods.

Scene analysis methods mostly consist of two stages: fingerprinting and estimation, also often called offline and online phases. The fingerprinting stage (offline phase) consists of collecting features (received signal strength for example) and positions to construct a map of the environment. In the estimation stage (online phase), the measured feature is compared with the collected features and matched with the closest one(s).

Scene analysis techniques include probabilistic methods, k-nearest neighbours, neural networks and support vector machines. Common examples of such methods include RADAR, described in P. Bahl and V. N. Padmanabhan, "*RADAR: An in-building RF-based user location and tracking system,*" in INFOCOM, 2000, pp. 775-784, which is based on the k-nearest neighbour approach.

Common examples of scene analysis techniques include the Horus system, described in M. Youssef and A. Agrawala, "*The Horus WLAN location determination system,*" in Proceedings of the 3rd international conference on Mobile systems, applications, and services. 2005, pp. 205-218, ACM, which relies on a probabilistic model.

For each scene analysis technique, every time the configuration of the environment changes (for instance, if some access points are moved, suppressed or added), the signal strength map is modified and the offline phase needs to be run again.

Triangulation techniques derive the position of the nodes using geometric properties. Triangulation techniques have two variations: angulation and lateration.

Angulation requires the user to know the angle of arrival of at least two connected reference nodes. The disadvantage of this method is that it demands a relatively complex hardware, as several antennas are required to estimate the angle of arrival. Moreover, its accuracy is also limited by shadowing and by multipath reflections.

Lateration uses the intersection of circles whose radius is proportional to the estimated distances from three or more reference points. The distance is typically derived from received signal strength ("RSS" in the following) or time of arrival ("TOA" in the following) measurements, as described for example in B. B. Peterson, C. Kmiecik, R. Hartnett, P. M. Thompson, J. Mendoza, and H. Nguyen, *Spread Spectrum Indoor Geolocation, U.S. Coast Guard Academy, Center for Advanced Studies,* 1998.

There are few approaches that propose to merge several channel measurements in order to get a more precise localization. Selective fusion localization (or "SELFLOC"), described for example in Y. Gwon, R. Jain, and T. Kawahara, "*Robust indoor location estimation of stationary and mobile users,*" in INFOCOM, 2004, is a scene analysis technique that combines several radio measurements and selectively fuses location information derived for each channel. It minimizes the mean squared error of the contribution from each measurements.

However, the proposed scene analysis technique needs to estimate both the correlation matrix of the positions estimated from the different channels, and the correlation vector between the estimated positions and each coordinate of the true location of the user. It requires then long computations, which require complex hardware and software to be executed.

Another approach merging several channel measurements in order to get a more precise localization is presented in B. M. Sadler, R. J. Kozick, and L. Tong, "*Multi-modal sensor localization using a mobile access point,*" 2005, which uses radio and acoustic channels to perform localization. It assumes that the access points ("APs" in the following) accurately know their own location at any time, and it leverages Doppler shifts, combined with TOA and angle of arrival ("AOA" in the following) to estimate the positions of the nodes. Besides the hardware costs, this approach specifically requires to know the positions of the APs, and the move the nodes in order to use the Doppler effect.

An aim of the present invention is to provide an indoor localization method and system simpler than the known solutions.

Another aim of the present invention is to leverage several channels present in an indoor environment for localization.

Another aim of the present invention is to leverage from several sensors present in mobile devices (wifi, Bluetooth, microphone, speaker, camera, etc) for a more accurate localization of such devices in indoor environments.

Another aim of the present invention is to provide an indoor localization method and system requiring simple hardware, and simple software to be executed.

Another aim of the present invention is to provide an indoor localization method and system which do not require to be changed if the configuration environment changes.

Another aim of the present invention is to provide an indoor localization method and system providing a more precise estimate of the indoor location of the nodes in a network.

BRIEF SUMMARY OF THE INVENTION

According to the invention, these aims are achieved by means of an indoor localization method for estimating the location of nodes, at least one node being connected to at least another node by at least two different channels, comprising the following steps:
measuring the distance between the connected nodes,
for each channel, building a Euclidean Distance Matrix based on the measured distances, estimating the location of the nodes based on the built Euclidean Distance Matrices.

The invention advantageously exploits the fact that the nodes of an indoor network are in general connected by at least two different channels. In other words, the inventive method exploits the available information present in different channels, in order to provide a more precise estimate of the location of the nodes in a network. The information provided by the different channels available is then efficiently leveraged.

For each channel, an Euclidean distance matrix (EDM) containing the (noisy and/or incomplete) distances measured between the connected nodes is built. From these EDMs, the underlying positions of the nodes is estimated by minimizing a cost function, which infuses information from all the available channels.

In other words, the connections between nodes in a given channel are represented as a noisy distance matrix. The method according to the invention estimates then the underlying positions of the nodes by combining information from the distance matrices, each distance matrix corresponding to a channel.

Advantageously, by using and combining data from several different channels, it is possible to mitigate the effects of multi-path and attenuate most of the noise. For instance, the combination of WiFi and FM radio signals has the following advantages: compared to WiFi signals, FM signals are less influenced and attenuated by human bodies and walls and are less subject to multipath and fading. On the other hand, FM radio antennas are located much further, which makes it harder to distinguish between nodes that are located close to each other. This issue can be compensated with WiFi measurements, which can provide finer localization.

The method according to the invention is simpler than the known solutions as it requires an inferior number of computing steps. Then, it does not require complex hardware and/or software to be executed.

Moreover it does not require to be changed if the configuration environment changes.

Advantageously, the method according to the invention can be executed in a distributed way, i.e. it does not necessarily require a single computation module, e.g. a server, for be executed. In fact, at least a set of nodes can comprise a computation module for executing the inventive method. In other words, the computations are not necessarily centralized, but can be distributed over at least a set of nodes. For example, each node can be a mobile device, e.g. a smartphone, comprising a computation module configured for executing at least a part of the localization method.

In a first embodiment, the distance between the connected nodes is measured by using the power of the signal received by the nodes. In a second embodiment, it is measured by using the time of arrival of the signal to each node.

In one embodiment, the step of estimating the location of the nodes comprises minimizing a cost function. Advantageously, this cost function can be computed depending on a Frobenius norm.

In one embodiment, the step of estimating the location of the nodes comprises minimizing a s-stress function. In other words, the inventive method can minimize a composite s-stress cost function based on noisy measurements collected on different channels. The use of the s-stress function enables to incorporate the contribution of several channels, contrary to the classical MDS or other methods.

If each node has more than one coordinate, the method can comprise the step of minimizing the cost function along each coordinate of the nodes.

In one embodiment, an optimal weighting is used for the case when the noise is not identical across the channels. In other words, the inventive method can weight each channel according to the liability in the localization process.

The invention concerns also an indoor localization system for estimating the location of nodes, at least one node being connected to at least another node by at least two different channels, comprising:

at least a data bus system, a memory coupled to the data bus system, wherein the memory comprises a computer usable program code, and a processing unit coupled to the data bus system, wherein the processing unit executes the computer usable program code to measuring the distance between the connected nodes, for each channel, building a Euclidean Distance Matrix (EDM) based on the measured distances, estimating the location of the nodes based on the built Euclidean Distance Matrices.

The invention concerns also a computer program product for estimating the indoor location of nodes, at least one node being connected to at least another node by at least two different channels, comprising:

a tangible computer usable medium including computer usable program code for estimating the location of the nodes in a indoor network, the computer usable program code being used for measuring the distance between the connected nodes, for each channel, building a Euclidean Distance Matrix (EDM) based on the measured distances, estimating the location of the nodes based on the built Euclidean Distance Matrices.

The invention relates also to a computer data carrier storing presentation content created with the method according to the invention.

The invention finally relates to a node comprising a computing module configured for carrying out the method according to the invention. In one embodiment, the node can be a mobile device or an access point or a server.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Euclidean Distance Matrix

Figure 1:
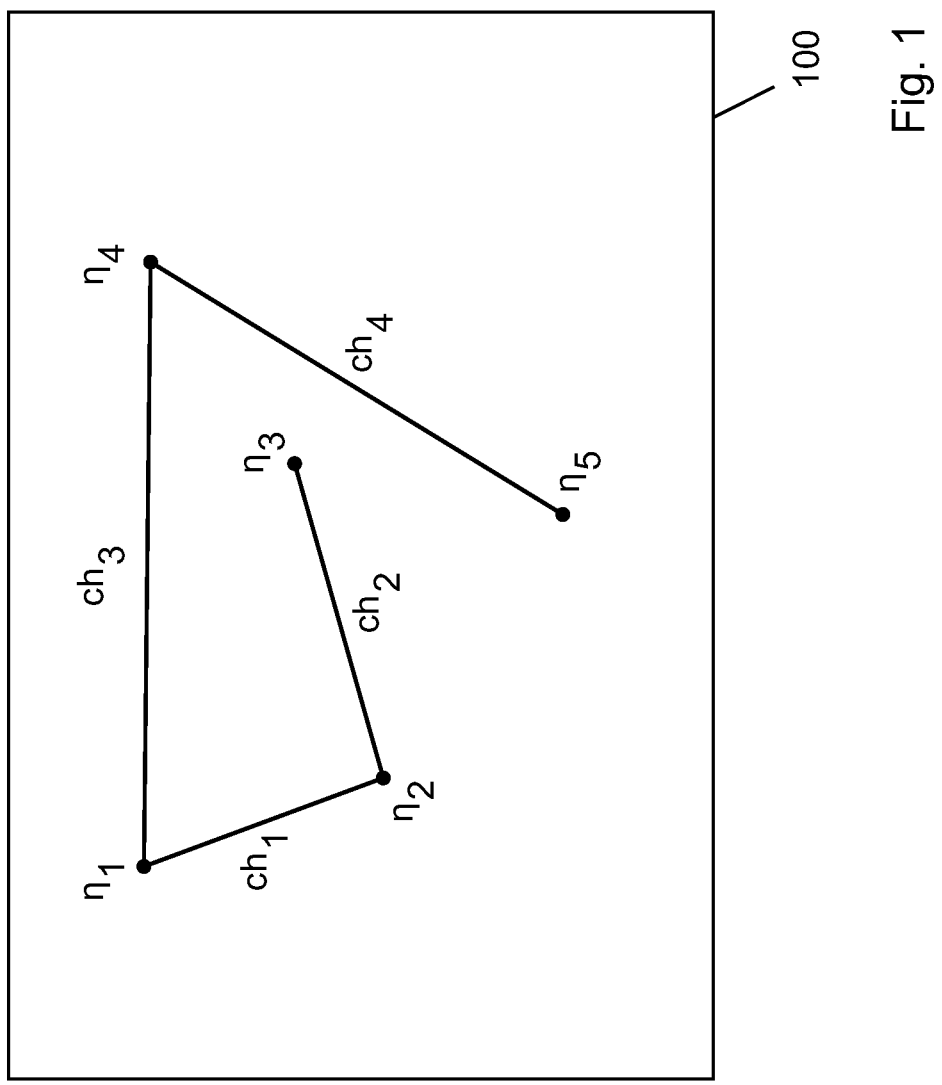
FIG. 1 shows a view of the nodes n1, n2, etc. of an indoor environment 100, along with the channels ch1, ch2, etc. between these nodes.

FIG. 1 shows a view of the n nodes n1, n2, etc. of an indoor environment 100.

The node n1 is connected to the node n2 by a first channel ch1, illustrated in FIG. 1, but also by a second channel ch1', not illustrated.

For example, each of the nodes n1, n2 are mobile devices, e.g. smartphones, the first channel ch1 is a Bluetooth channel and the second channel ch1' is a WiFi channel. The same applies for the other nodes ni-nj of FIG. 1

It must be understood that the present invention is not limited to the presence of only two channels between two nodes, but it applies also to any number of channels between two or more nodes. For example, a third FM radio channel ch1" can connect the nodes n1 and n2

In FIG. 1, each channel indicates a communication means. For example, the channel ch1 can be a WiFi channel. Then, it is clear that the channel ch1 does not connect only the node n1 with the node n2, but that it can also connect the node n1 with n3 and/or n4 and/or n5. The same applies to the other channels.

Each node can have an r-dimensional position (r can be called the embedding dimension and is typically 2 or 3). An EDM D is built from an N×r positions matrix $$X = [x_1 \ x_2 \ \ldots \ x_n]^T$$

where $$x_i = [x_{i,1} \ x_{i,2} \ \ldots \ x_{i,r}]^T$$

It is possible to define $$d_{ij} = \langle x_i - x_j, x_i - x_j \rangle$$
$$= \|x_i\|^2 + \|x_j\|^2 + 2x_i^T x_j,$$

Or, in a matrix annotation $$D = 1z^T + z1^T - 2XX^T, \quad (1)$$

where $$z = [\|x_1\|^2 \|x_2\|^2 \ldots \|x_N\|^2]_5^T$$

and $1 = [1 \ 1 \ \ldots \ 1]^T$.

In the noiseless case, it is possible to perfectly recover the positions from D up to some rigid transformation (translations, rotations and reflections) via the classical MDS algorithm. In the presence of noise, it is possible to approximate the positions by adding low-rank approximation to the procedure.

Estimation of the Distances Between Nodes

The EDMs are build based on the distances between the connected nodes. There are two most common methods or techniques for providing an estimate of the distance between the connected nodes based on noisy measurements.

The first technique relies on the log-distance path loss model for radio channels, and it is described for example in T. S. Rappaport, *Wireless Communications: Principles and Practice, IEEE Press*, Piscataway, N.J., USA, 1st edition, 1996.

The path loss PL(dB) is defined as the difference between the transmitted power and the received power. The received power is often called Received Signal Strength (or "RSS"). Assuming unity gains for the receiving and transmitting antennas, it is possible to write it as follows:

$$PL(dB) = P_{T_x} - P_{R_x}$$
$$= PL_0 + 10\gamma \log_{10}\left(\frac{d}{d_0}\right),$$

where $P_{T_x}$ is the transmitted power in dBm, $P_{R_x}$ is the received power in dBm, $P_{L0}$ is the path loss at a reference distance $d_0$, d is the length of the path, $d_0$ is the reference distance (for example 1 km) and $\gamma$ is the path loss exponent.

Another common approach to deduce distances uses the TOA of the signal. The distance is simply estimated by multiplying the TOA with the wave propagation speed.

Noise Distribution

In practice, the measured distances are noisy. Among others, sources of noise include multipath, unavailability of line-of-sight path or the presence of numerous reflecting surfaces.

It has been shown (see for example N. Patwari and Alfred O. Hero III, "*Using proximity and quantized RSS for sensor localization in wireless networks,*" 2003) that the random variable $P_{i,j}$ can be modeled with a log normal random variable:

$$P_{R_x}(dBm) \sim \mathcal{N}(\overline{P_{R_x}}, \sigma_{dB}^2),$$

where $$\overline{P_{R_x}}(dBm) = P_0 - 10\gamma \log_{10}\left(\frac{d}{d_0}\right).$$

Likewise, the distribution of the time of arrival can be modeled as a Gaussian, as described for example in A. Catovic and Z. Sahinoglu, "*The Cramer-Rao bounds of hybrid TOA/RSS and TDOA/RSS location estimation schemes,*" Communications Letters, IEEE, vol. 8, no. 10, pp. 626-628, October 2004:

$$t_i \sim \mathcal{N}(d/c, \sigma_T^2),$$

where c is the speed of light and $\sigma_T^2$ accounts for the multipath effects and the measurement error.

Problem Formulation

An indoor environment 100 can contain n nodes (see e.g. FIG. 1). Typically, nodes can be physical users with mobile devices or access points. Some nodes are connected to each other via different channels. For instance, a mobile user could be connected to a router over a WiFi channel, or two users could be connected to each other via Bluetooth.

The number of different channels is denoted by K. It is possible to assign a 2D position to each node i, denote by $x_i = [x_i, y_i]^T$.

As mentioned, from the positions $\{x_i\}_{i=1}^N$ it is possible to construct an EDM D, called the ground truth.

K noisy measurement matrices (one for each channel) can then be build. They are denoted as $D_k$ (k=1; ...; K):

$$D_k = D + N_k, \quad (2)$$

where $N_k$ is a symmetric noise matrix whose diagonal entries are 0 (it is assumed that the zero self-distance property holds).

As discussed, it is possible to model the noise as a Gaussian random variable, that is $$N_{k,ij} \sim N(0, \sigma_k^2).$$

The method according to the invention aims to determine the best estimate $\hat{D}$ of D, such that $\hat{D}$ is an EDM and as close as possible to the noisy measurements.

There are different ways to define a distance measure between two matrices: in one preferred embodiment, the method according to the invention minimizes the Frobenius norm of the difference between $\hat{D}$ of $D_k$.

Multi-Channel Localization: Independent Identically Distributed Noise

At first, it is assumed that the noise is identically distributed in each channel. Moreover, it is supposed that the measurements are independent (within EDMs and between EDMs). For now, it is assumed that the noisy EDMs are complete (this assumption will be relaxed later).

Single Channel

It is assumed that there is a single noisy measurement matrix $D_1$ (K=1). In this case, it is possible to estimate $\hat{D}$ by minimizing the following cost function:

$$\hat{D} = \underset{\hat{D} \in EDM(2)}{\operatorname{argmin}} \|\hat{D} - D_1\|_F.$$

The above formulation could be considered as equivalent to minimizing the s-stress function, denoted as f(X):

$$\min_{X \in R^{N \times 2}} f(X) = \min_{X \in R^{N \times 2}} \sum_{i=1}^{N} \sum_{j=1}^{N} (\|x_i - x_j\|^2 - d_{1,ij}^2)^2$$

One way to solve this problem is to use a coordinate descent approach: the estimate is successively refined by minimizing the cost function along each coordinate separately.

Multiple Channels

The problem defined above can be generalized for several channels (K>1) and since the noise is identically distributed across channels ($\sigma_i^2 = \sigma_j^2$ for all i; j∈{1, 2, ..., K}), it is not necessary to weight them differently. The generalization is performed by minimizing the following expression:

$$\min_{X \in R^{N \times 2}} \sum_{k=1}^{K} \sum_{i=1}^{N} \sum_{j=1}^{N} (\|x_i - x_j\|^2 - d_{k,ij}^2)^2 \quad (3)$$

As before, this problem can be solved with a coordinate descent approach.

Non-Identical Noise Across Channel

If the noise is not identical across measurement matrices (but still independent), it is possible to improve the minimization in (3) by giving more weight to matrices with little noise and vice-versa. Taking into account different weights, expression (3) becomes:

$$\min_{X \in R^{N \times 2}} \sum_{k=1}^{K} w_k \sum_{i=1}^{K} \sum_{j=1}^{N} (\|x_i - x_j\|^2 - d_{k,ij}^2)^2 \quad (4)$$

where $\{w_k\}_{k=1}^{K}$ are such that $$\sum_{k=1}^{K} w_k = 1.$$

Lemma

Let $\{D_k\}_{k=1}^{K}$ be a set of noisy matrices defined as $D_k = D + N_k$, where D is an EDM and the entries of $N_k$ are normally distributed with mean zero and variance $\sigma_k$. The set of weights $\{w_k\}_{k=1}^{K}$ that minimizes the variance of expression $$\Sigma_{k=1}^{K} w_k \Sigma_{i=1}^{N} \Sigma_{j=i+1}^{N} N_{k,ij}^2$$

is given by:

$$w_k = \frac{1/\sigma_k^4}{\sum_{i=1}^{K} 1/\sigma_i^4}.$$

An alternative approach is to minimize the expected value of S, in which case it is possible to show that the weights are given by:

$$w_i = \begin{cases} 1 & \text{if } i = \operatorname{argmin}_j \sigma_j^2, \\ 0 & \text{otherwise} \end{cases}.$$

Incomplete Matrix

In practice, it is unlikely that the nodes are all connected to each other and therefore the noisy EDMs $D_k$ are not complete. The extension of the inventive method to account for incomplete measurement matrices is as follows, the difference being that the optimization is performed only on the measured distances:

$$\min_{X \in R^{N \times 2}} \sum_{k=1}^{K} w_k \sum_{i=1}^{N} \sum_{j \in \mathcal{I}_{k,i}} (\|x_i - x_j\|^2 - d_{k,ij}^2)^2,$$

where $$\mathcal{I}_{k,i}$$

denotes the set of all nodes connected to node i in channel k.

Simulations

The applicant assesses the performance of the described method with various experiments. First, it is assumed that all channels are corrupted with the same noise. This assumption can be then relaxed, and an optimal choice of weights in the case of non-identical noise across measurement matrices can be discussed. Finally, the situation of incomplete matrices is investigated. The distance metric used to quantify the results is the Frobenius norm of $\|\hat{D} - D\|_F$ the difference between the estimate and the ground truth matrices.

Figure 2:
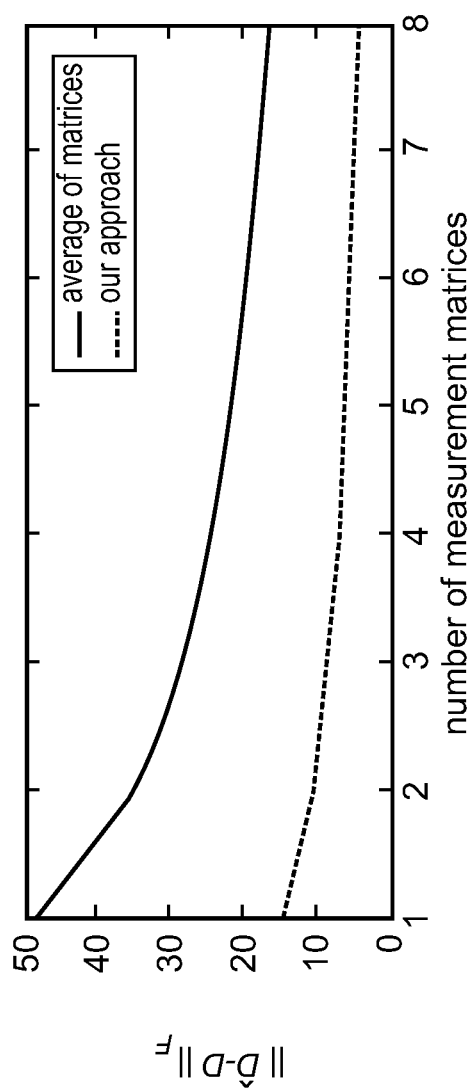
FIG. 2 shows the reconstruction error versus the number of measurement matrices contaminated with independent and identically distributed Gaussian noise.

At first, it is assumed that the noise is independent and identically distributed across all channels, that is $\sigma_k^2 = 1$ for k=1, ..., K. The method described above is compared with a naïve algorithm which simply takes the average of all measurement matrices. In the experiment, 50 2D coordinates uniformly distributed between 0 and 10 have been generated to construct the ground truth EDM D. The matrix D is corrupted by Gaussian noise with mean zero and unit variance in order to generate the noisy measurement matrices $\{D_k\}_{k=1}^{K}$. The evolution of $$\|\hat{D}-D\|_F$$

is studied as the number of noisy matrices increases. The experiment has been repeated 10 times and average the obtained results. As illustrated in FIG. 2, the inventive method performs better and leads to a Frobenius norm that is about three times smaller.

Non-Identical Noise

If the noise is not identical across measurement matrices, the contribution of each $D_k$ can be weighted differently, as discussed above. In the following experiment, weighting strategies are studied:

1. $w_i=1$ with i corresponding to the smallest variance and 0 otherwise, which is the result minimizing the expected value of S (cf. equation (6)).

2. $w_i=1/K$, which corresponds to putting the same weight for each channel, regardless of the noise power.

3.

$$w_i = \frac{1/\sigma_i^2}{\sum_{k=1}^{K} 1/\sigma_k^2},$$

which assigns weights that are inversely proportional to the corresponding variances.

4.

$$w_i = \frac{1/\sigma_i^4}{\sum_{k=1}^{K} 1/\sigma_k^4},$$

which yields the best estimate minimizing the variance of S.

Again, the positions of the nodes are chosen uniformly between 0 and 10, but this time the measurement matrices are corrupted with independent Gaussian noise with mean zero and variance $\sigma_k$, where $\sigma_k$ is uniformly distributed between 1 and 5. The experiment has been run 10 times and the results have been averaged.

Figure 3:
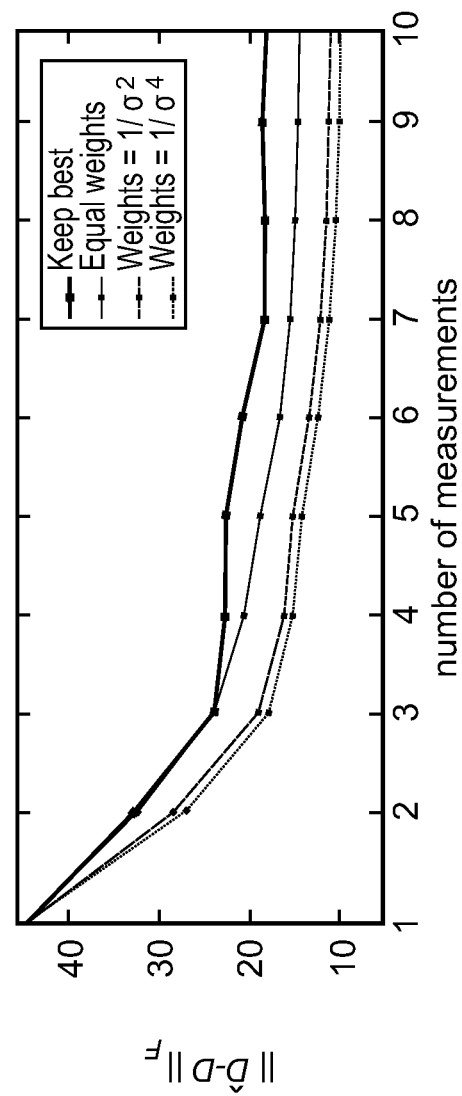
FIG. 3 shows the reconstruction error versus the number of measurement matrices for independent and non-identical noise and different weighting strategies.

FIG. 3 shows that setting weights equal to the fourth possibility here above is the best approach, which corresponds to minimizing the variance of $$\Sigma_{k=1}^{K} w_k \Sigma_{i=1}^{N} \Sigma_{j=i+1}^{N} N_{k,ij}^2$$

Incomplete Matrices

Finally, the case of incomplete measurement matrices is discussed. Two ways are available for generating incomplete matrices: the use of Bernouilli random variables and an approach with structured missing entries. The former approach assigns to each matrix entry a probability p to be measured while in the latter case, the entries are manually grouped in non-overlapping batches. In the following experiments, it is assumed that the distances are corrupted with Gaussian noise with mean zero and variances uniformly distributed between 1 and 5. Moreover, the best set of weights is selected, that is the fourth possibility here above.

Figure 4:
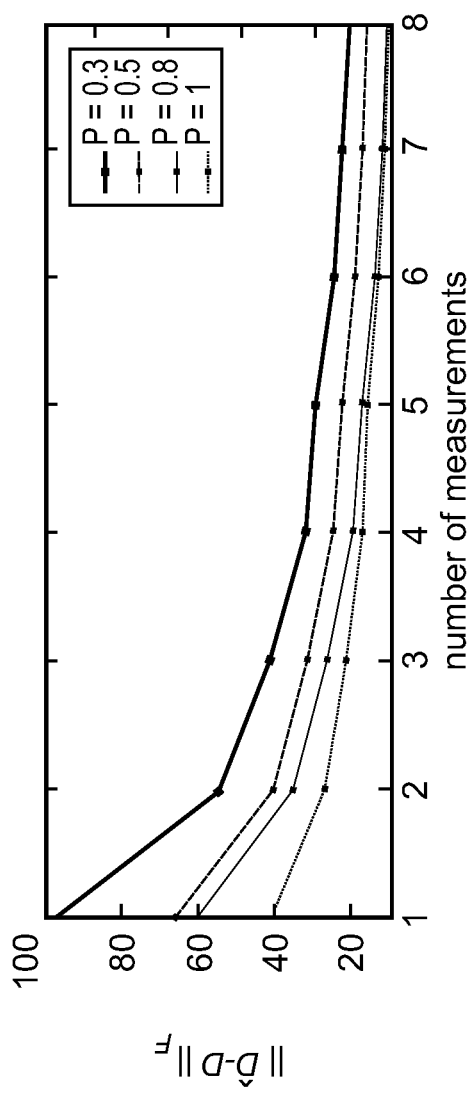
FIG. 4 shows the reconstruction error versus the number of measurement matrices for independent noise and different probabilities of being connected.

First, the probability of each entry to be measured follows a Bernouilli distribution with parameter p is discussed. The number of nodes is fixed at 50 and the distances are randomly discarded with a fixed probability 1−p while p varies between 0.3 and 1. The experiment has been repeated 10 times and averaged. As depicted in FIG. 4, an increase in the number of EDMs improves the estimation of the ground truth. By decreasing p, the performance gets worse.

Figure 5:
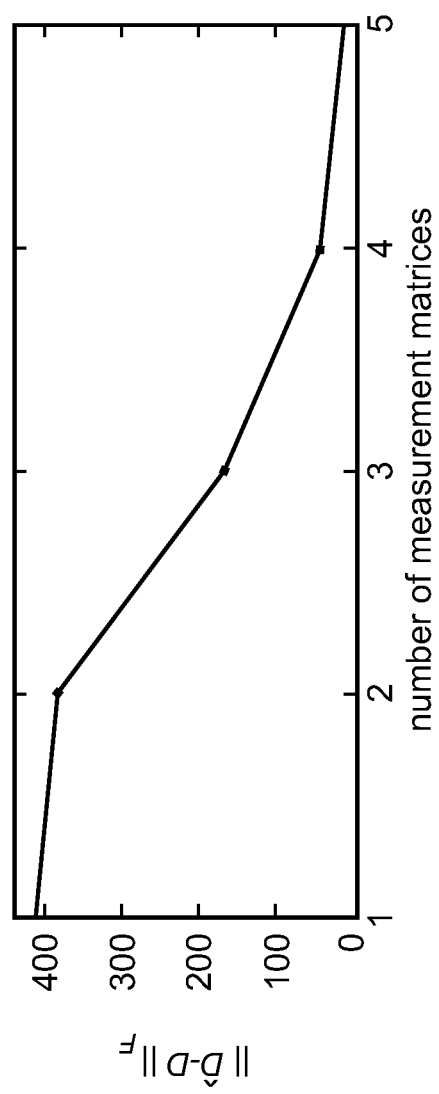
FIG. 5 shows the reconstruction error versus the number of measurement matrices (channels) for independent noise and different probabilities of being connected (10 nodes). Each matrix has about one fifth of the entries of the complete matrix.

Second, the performance of the described method is assessed with structured and non-overlapping entries, which are organized in groups. For instance, the upper left part of D is assigned to channel 1, the upper middle part to channel 2 and so on. The number of nodes is set to 10 and each measurement matrix contains about one fifth of the entries of the original matrix. The experiment has been repeated 20 times and averaged, and FIG. 5 illustrates the results on channel with Gaussian noise with mean zero and variance uniformly distributed between 1 and 5. The estimation improves drastically with 4 and 5 matrices.

Figure 6:
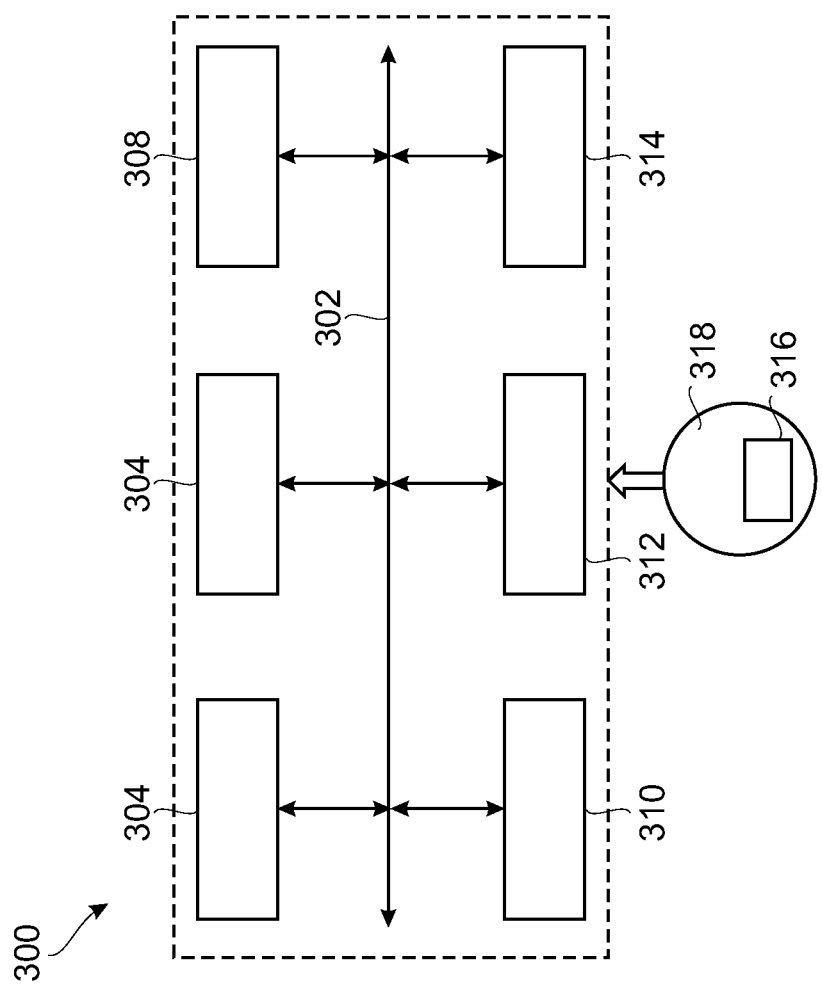
FIG. 6 is the illustration of an embodiment of a data processing system in which a method in accordance with an embodiment of the present invention may be implemented.

FIG. 6 is an embodiment of a data processing system 300 in which an embodiment of a method of the present invention may be implemented. The data processing system 300 of FIG. 6 may be located and/or otherwise operate at any node of a computer network, that may exemplarily comprise clients, servers, etc., and it is not illustrated in the Figure. In the embodiment illustrated in FIG. 6, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, the processor unit 304 may be a symmetric multi-processor system containing multiple processors of the same type.

In some embodiments, the memory 306 shown in FIG. 6 may be a random access memory or any other suitable volatile or non-volatile storage device. The persistent storage 308 may take various forms depending on the particular implementation. For example, the persistent storage 308 may contain one or more components or devices. The persistent storage 308 may be a hard drive, a flash memory, a rewritable optical disk, a rewritable magnetic tape, or some combination of the above. The media used by the persistent storage 308 also may be removable such as, but not limited to, a removable hard drive.

The communications unit 310 shown in FIG. 6 provides for communications with other data processing systems or devices. In these examples, communications unit 310 is a network interface card. Modems, cable modem and Ethernet cards are just a few of the currently available types of network interface adapters. In one preferred embodiment, the communications unit 310 comprises a WiFi and/or a Bluetooth and/or a FM and/or an acoustic and/or other kind of communication sensors. Communications unit 310 may provide communications through the use of either or both physical and wireless communications links.

The input/output unit 312 shown in FIG. 6 enables input and output of data with other devices that may be connected to data processing system 300. In some embodiments, input/output unit 312 may provide a connection for user input through a keyboard and mouse. Further, input/output unit 312 may send output to a printer. Display 314 provides a mechanism to display information to a user.

Instructions for the operating system and applications or programs are located on the persistent storage 308. These instructions may be loaded into the memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on the computer readable media 318 that is selectively removable and may be loaded onto or transferred to data processing system 300 for execution by processor unit 304. Program code 316 and computer readable media 318 form a computer program product 320 in these examples. In one example, the computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, the computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, the program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 6 can be varied from the illustrative examples shown. For example, a storage device in data processing system 300 is any hardware apparatus that may store data. Memory 306, persistent storage 308, and computer readable media 318 are examples of storage devices in a tangible form.

The invention claimed is:

1. An indoor localization method for estimating the location of nodes, comprising the following steps:
   connecting at least one node to at least another node by at least two different types of channels, the first type of channel being configured to carry a first type of signal, the second type of channel being configured to carry a second type of signal different from the first type of signal,
   for each type of channel, determining a distance between the connected nodes based on data from said nodes and/or from said channel,
   for each type of channel, building a Euclidean Distance Matrix based on the determined distances,
   estimating the location of the nodes based on the built Euclidean Distance Matrices.

2. The method of the previous claim, wherein at least one signal is transmitted from one node and received by at least another node, comprising
using a power of the signal received by the node in order to measure the distance between the connected nodes.

3. The method of claim 1, wherein the nodes are synchronized, the method comprising
using the time of arrival of the signal to a node in order to measure the distance between the connected nodes.

4. The method of claim 1, wherein estimating the location of the nodes comprises
minimizing a cost function.

5. The method of the previous claim 4, comprising
computing said cost function by using a Frobenius norm.

6. The method of claim 4, comprising
minimizing a s-stress function.

7. The method of the claim 6, wherein the s-stress function is $$\min_{X \in R^{N \times 2}} \sum_{k=1}^{K} \sum_{i=1}^{N} \sum_{j=1}^{N} (\|x_i - x_j\|^2 - d_{k,ij}^2)^2$$

wherein K is the number of channels, each node has a 2D location $x_i = [x_i, y_i]^T$, and $$d_{ij} = \langle x_i - x_j, x_i - x_j \rangle$$
$$= \|x_i\|^2 + \|x_j\|^2 + 2x_i^T x_j.$$

8. The method of the previous claim 6, wherein the s-stress function is $$\min_{X \in R^{N \times 2}} \sum_{k=1}^{K} w_k \sum_{i=1}^{N} \sum_{j=1}^{N} (\|x_i - x_j\|^2 - d_{k,ij}^2)^2$$

wherein K is the number of channels, each node has a 2D location $x_1 = [x_i, y_i]^T$, $$d_{ij} = \langle x_i - x_j, x_i - x_j \rangle$$
$$= \|x_i\|^2 + \|x_j\|^2 + 2x_i^T x_j$$

and $w_k$ is a weight such that $$\sum_{k=1}^{K} w_k = 1.$$

9. The method of claim 8, comprising
selecting the set of weights $\{w_k\}_{k=1}^{K}$ such that the variance of the expression $$\Sigma_{k=2}^{K} w_k \Sigma_{i=1}^{N} \Sigma_{j=i+1}^{N} N_{k,ij}^2$$

is minimized.

10. The method of claim 9, comprising
selecting the set of weights $\{w_k\}_{k=1}^{K}$ such that $$w_k = \frac{1/\sigma_k^4}{\sum_{i=1}^{K} 1/\sigma_i^4}$$

wherein $\sigma_k$ is the variance of the noise of the measured distances between the connected nodes, or the variance of the noise of each channel.

11. The method of claim 4, wherein each node has more than one coordinate, the method comprising
minimizing the cost function along each coordinate of the nodes.

12. The method of claim 4, comprising
considering the noise of each channel
weighting each corresponding channel in the cost function based on this noise.

13. The method of claim 12, comprising
selecting the channel having the smallest variance $\sigma_k$ of the noise of the measured distances between the connected nodes.

14. The method of claim 12, comprising
using the same weight for each channel.

15. The method of claim 12, comprising
assigning to each channel a weight which is inversely proportional to the corresponding variance.

16. The method of claim 15, comprising
calculating the weight according to the following formula $$w_i = \frac{1/\sigma_i^2}{\sum_{k=1}^{K} 1/\sigma_k^2}$$

wherein $w_i$ is the weight and $\sigma_k$ is the variance of the noise of the channel.

17. The method of claim 4, comprising
if the build Euclidean Distance Matrices are not complete, minimizing the cost function only for the measured distances.

18. The method of claim 1, wherein at least one node is a mobile device or an access point or a server.

19. The method of claim 1, wherein the at least two channels are selected among the following channels: WiFi channel, Bluetooth channel, cellular channel, FM channel.

20. The method of claim 1, the location of the nodes being a 2D location.

21. The method of claim 1, the location of the nodes being a 3D location.

22. An indoor localization system for estimating the location of nodes, at least one node being connected to at least another node by at least two different types of channels which are configured to carry different types of signals, comprising:
at least a data bus system,
a memory coupled to the data bus system,
wherein the memory comprises a computer usable program code, and
a processing unit coupled to the data bus system,
wherein the processing unit executes the computer usable program code to
send a first type of signal over a channel which connects two nodes, and sending a second type of signal over a different type of channel which connects said two nodes
determine the distance between the connected nodes based on the signals sent,
for each type of channel, build a Euclidean Distance Matrix based on the determined distances,
estimate the location of the nodes based on the built Euclidean Distance Matrices.

23. A computer program product for estimating the indoor location of nodes, comprising:
a non-transitory tangible computer usable medium including computer usable program code for estimating the location of the nodes, the computer usable program code being used for
connecting at least one node to at least another node by at least two different types of channels, the first type of channel being configured to carry a first type of signal, the second type of channel being configured to carry a second type of signal different from the first type of signal
for each type of channel, determining a distance between the connected nodes based on data from said nodes and/or from said channel,
for each type of channel, building a Euclidean Distance Matrix based on the determined distances,
estimating the location of the nodes based on the built Euclidean Distance Matrices.

24. A non-transitory computer data carrier storing the estimation of the location of nodes created with an indoor localization method for estimating the location of nodes, said method comprising the following steps:
connecting at least one node to at least another node by at least two different types of channels, the first type of channel being configured to carry a first type of signal, the second type of channel being configured to carry a second type of signal different from the first type of signal,
for each type of channel, determining a distance between the connected nodes based on data from said nodes and/or from said channel,
for each type of channel, building a Euclidean Distance Matrix based on the determined distances,
estimating the location of the nodes based on the built Euclidean Distance Matrices.

25. A node arranged to be connected to at least another node by at least two different types of channels, the first type of channel being configured to carry a first type of signal, the second type of channel being configured to carry a second type of signal different from the first type of signal, said node comprising a computing module configured for carrying out the following steps:
for each type of channel, determining a distance between the connected nodes based on data from said nodes and/or from said channel,
for each type of channel, building a Euclidean Distance Matrix based on the determined distances,
estimating the location of the nodes based on the built Euclidean Distance Matrices.

26. The node according to claim 25, wherein the node is defined by a mobile device or an access point or a server.

27. An indoor localization method for estimating the location of nodes, comprising the following steps:
connecting at least one node to at least another node by at least two different types of channels, the first type of channel being configured to carry a first type of signal, the second type of channel being configured to carry a second type of signal different from the first type of signal, for each type of channel, determining a distance between the connected nodes based on data from said nodes and/or from said channel, for each type of channel, building a Euclidean Distance Matrix based on the determined distances, estimating the location of the nodes based on the built Euclidean Distance Matrices, wherein estimating the location of the nodes comprises minimizing a s-stress function, wherein the s-stress function is $$\min_{X \in R^{N \times 2}} \sum_{k=1}^{K} \sum_{i=1}^{N} \sum_{j=1}^{N} (\|x_i - x_j\|^2 - d_{k,ij}^2)^2$$

wherein K is the number of channels, each node has a 2D location $x_i = [x_i, y_i]^T$, and $$d_{ij} = \langle x_i - x_j, x_i - x_j \rangle$$
$$= \|x_i\|^2 + \|x_j\|^2 + 2x_i^T x_j.$$

28. An indoor localization method for estimating the location of nodes, comprising the following steps:

connecting at least one node to at least another node by at least two different types of channels, the first type of channel being configured to carry a first type of signal, the second type of channel being configured to carry a second type of signal different from the first type of signal, for each type of channel, determining a distance between the connected nodes based on data from said nodes and/or from said channel, for each type of channel, building a Euclidean Distance Matrix based on the determined distances, estimating the location of the nodes based on the built Euclidean Distance Matrices, wherein estimating the location of the nodes comprises minimizing a cost function, the method further comprising considering the noise of each channel weighting each corresponding channel in the cost function based on this noise if the build Euclidean Distance Matrices are not complete, minimizing the cost function only for the measured distances.

\* \* \* \* \*